July 12, 1955  R. A. HARRIS  2,712,800
APPARATUS FOR CUTTING PIECES FROM A ROPE
OF TOFFEE OR THE LIKE MATERIAL
Filed Feb. 4, 1952  2 Sheets-Sheet 1

Inventor
Richard Auson Harris
By Moses, Nolte, Crews & Berry
Attorneys

United States Patent Office 2,712,800
Patented July 12, 1955

2,712,800
APPARATUS FOR CUTTING PIECES FROM A ROPE OF TOFFEE OR THE LIKE MATERIAL

Richard Anson Harris, Leeds, England, assignor to The Forgrove Machinery Company Limited, Leeds, England, a company of Great Britain Application February 4, 1952, Serial No. 269,866

3 Claims. (Cl. 107—21)

This invention relates to apparatus for feeding and cutting a rope of toffee, caramel or like plastic material of the type comprising a knife for severing in succession pieces from the end of the rope, a pair of feed rollers for feeding the rope to the knife, and a guide for confining and guiding the rope during its passage from the feed rollers to the knife.

Occasionally, in operation of such apparatus, the rope of plastic material fails to pass freely beyond the cutting knife, due either to expansion of the rope or to some other obstruction to its passage such, for example, as a chipped cutting knife. When this occurs the rope, still being fed from the rollers, piles up and jams in the guide and round the rollers before the operator can stop the machine, the cleaning of which causes a major stoppage with loss of output. The invention aims to obviate this disadvantage.

The invention accordingly provides an apparatus of the above type which includes a device for gauging the thickness of the rope during its passage along the guide and means coacting with the gauging device and operative, in the event of the thickness of the rope exceeding a predetermined limit, to interrupt the feed of the rope. In this way, delays due to stoppage are reduced to a minimum, since the feed of the rope will be automatically interrupted before the rope can pile up in front of the cutting knife to an extent sufficient to jam the guide and, indeed, before any such tendency is visible to the operator of the machine.

Figure 1:
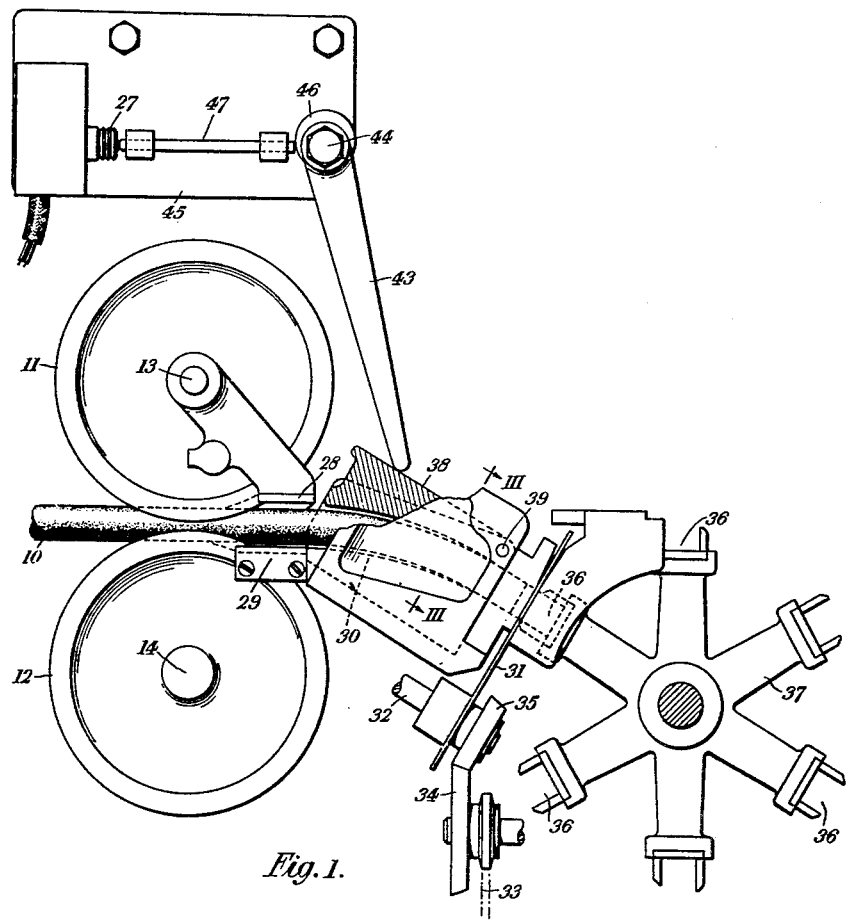
Figure 3:
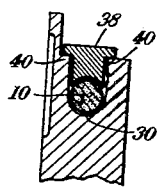
Figure 4:
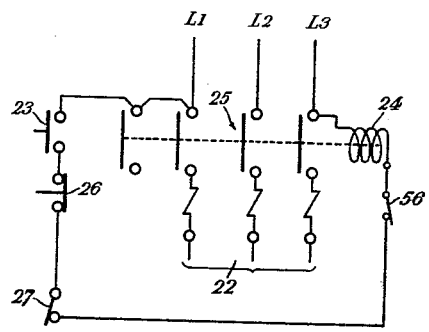
Figure 2:
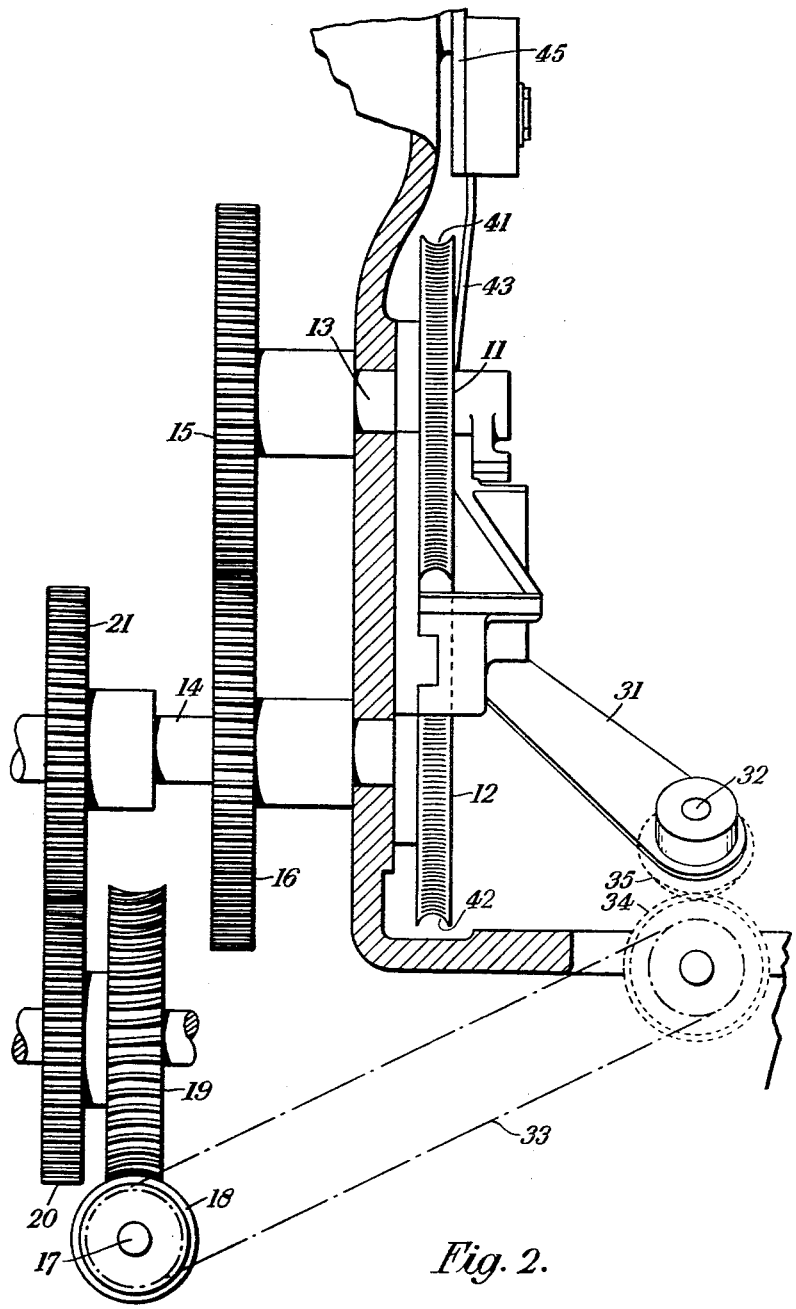

One form of apparatus according to the invention for feeding and cutting toffee will now be described in detail, by way of example, with reference to the accompanying drawings, in which:

Fig. 1 is a side elevation showing the feed rollers, the guide and the cutting knife, the guide being partly broken away, Fig. 2 is a sectional elevation looking from the left hand end of Fig. 1, Fig. 3 is a detail section on the line III—III in Fig. 1, and Fig. 4 is a circuit diagram.

The rope 10 of toffee is fed between two feed rollers 11, 12 fixed respectively to shafts 13, 14. The shafts are geared together by gears 15, 16 and the lower shaft 14 is driven from the main driving shaft 17 of the machine through the agency of a worm 18, a worm wheel 19 and gears 20, 21. When the machine is running the main driving shaft 17 is driven by a three phase A. C. electric motor 22 (Fig. 4). When a start button 23 is depressed, a coil 24 of a relay 25 is energized to close various contacts thereof, thereby connecting the motor 22 to the supply lines L1, L2, L3. The coil 24 may be de-energized to allow the relay 25 to open to stop the motor by depressing a stop button 26. The coil 24 may also be deenergized by opening of an overload release switch 56 or by opening of a normally closed trip switch 27 as described later.

The rope 10 emerging from the pass between the continuously rotating feed rollers 11, 12 is fed between upper and lower strippers 28, 29 into a downwardly curved channel section guide 30 and thence to a rotary cutting knife 31 mounted on a shaft 32 driven by a chain drive 33 and bevel gears 34, 35 from the main drive shaft 17. The knife 31 operates periodically in conventional manner well known in the art to sever a piece of toffee from the leading end of the rope 10, the cut pieces being delivered into the pockets 36 of an intermittently rotating pocket wheel 37. The pocket wheel 37 is driven from the main shaft 17 through a Geneva mechanism (not shown) and dwells periodically with a pocket 36 opposite the end of the guide 30. After the leading end of the rope 10 has entered the pocket 36, the knife 31 cuts the rope, and the wheel 37 moves on to bring the next pocket 36 opposite the end of the guide. The wheel 37 serves to carry the cut pieces of toffee to a wrapping wheel, not shown.

The feed rollers 11, 12 have peripheral grooves 41, 42 with knurled surfaces to afford a grip on the rope 10.

Above the guide 30 is a cover plate 38 hinged to the top of the guide at its forward end 39, i. e. the end nearest the knife. The cover plate 38 can be raised to clean the guide channel, but normally rests, by its own weight or by spring pressure, on the side members 40 of the guide channel to form to top guide which is just clear of the rope of toffee.

A lever 43 is pivoted at its upper end 44 to a plate 45 carrying the trip switch 27. The lower end of the lever 43 rests on the cover plate 38. An eccentric 46 on the upper end of the lever coacts with one end of a sliding rod 47, the other of which serves to actuate the trip switch 27. This is a normally closed microswitch which opens on movement of the rod 47 to the left as seen in Fig. 1.

In the event of the rope of toffee in the channel guide 30 swelling, the cover plate 38 will be raised and the lever 43 will be rotated thereby causing the eccentric 46 to displace the rod 47 to actuate the trip switch 27, and so to stop the electric motor driving the apparatus as already described.

What I claim as my invention and desire to secure by Letters Patent is:

1. Apparatus for feeding and cutting a rope of toffee, caramel or like plastic material, comprising a knife for severing in succession pieces from the end of the rope, a pair of feed rollers for feeding the rope to the knife, a channel section guide extending between said feed rollers and said knife for confining and guiding the rope during its passage from the feed rollers to the knife, a hinged cover for the guide, said cover being hinged to said guide at the end thereof nearer said knife, a trip member arranged to be actuated by upward movement of said cover, and mechanism responsive to actuation of the trip member for stopping the feed rollers.

2. Apparatus for feeding and cutting a rope of toffee, caramel or like plastic material, comprising a knife for severing in succession pieces from the end of the rope, a pair of feed rollers for feeding the rope to the knife, a channel section guide extending between said feed rollers and said knife for confining and guiding the rope during its passage from the feed rollers to the knife, an electric motor for operating said feed rollers and knife, a hinged cover for said guide, said cover being hinged to said guide at the end thereof nearer said knife, and a trip switch operable by upward movement of said cover and effective, when operated, to stop said motor.

3. Apparatus as claimed in claim 2, comprising a pivoted lever coacting with the cover and arranged to receive pivotal movement when the cover is lifted and a rod, coacting with an eccentric on the lever, for actuating the trip switch.

References Cited in the file of this patent

UNITED STATES PATENTS

| 1,077,818 | Eagar | Nov. 4, 1913 |
| 1,404,073 | Turk | Jan. 17, 1922 |
| 1,484,262 | Grodin | Feb. 19, 1924 |
| 2,125,859 | Liebelt | Aug. 2, 1938 |
| 2,201,180 | Jordan | May 21, 1940 |

FOREIGN PATENTS

| 705,795 | Germany | May 9, 1941 |